No. 767,800. PATENTED AUG. 16, 1904.
J. DICKASON.
DRIVING GEAR FOR CYCLES OR OTHER MECHANISMS.
APPLICATION FILED MAR. 21, 1904.
NO MODEL.

Witnesses: Inventor
J. M. Fowler Jr. James Dickason
Severance By Mason Fenwick Lawrence
 Attys.

No. 767,800. Patented August 16, 1904.

UNITED STATES PATENT OFFICE.

JAMES DICKASON, OF APOLLO BAY, VICTORIA, AUSTRALIA.

DRIVING-GEAR FOR CYCLES OR OTHER MECHANISMS.

SPECIFICATION forming part of Letters Patent No. 767,800, dated August 16, 1904.

Application filed March 21, 1904. Serial No. 199,223. (No model.)

*To all whom it may concern:*

Be it known that I, JAMES DICKASON, blacksmith, a subject of the King of Great Britain and Ireland, residing at Apollo Bay, in the county of Polworth, State of Victoria, Commonwealth of Australia, have invented certain new and useful Improvements in Driving-Gear for Cycles or other Mechanism, of which the following is a specification.

The object of my invention is to provide a cheap, self-contained, and effective speed-gear for chain-driven or other cycles or like mechanism which shall not only occupy but little side space, but be easily attached and detached and not liable to derangement. In the past various gears have been used to this end; but with my invention one is produced which is small in first cost, easy running, is accessible for inspection and repairs, and is also at the same time so designed that the lubrication and cleansing thereof can be most completely carried out, in addition to which the sprocket-chain (if one be used) is subjected to less undue strains, since the two sprocket-wheels can both be of a large if not nearly the same diameter.

Figures 1, 2:
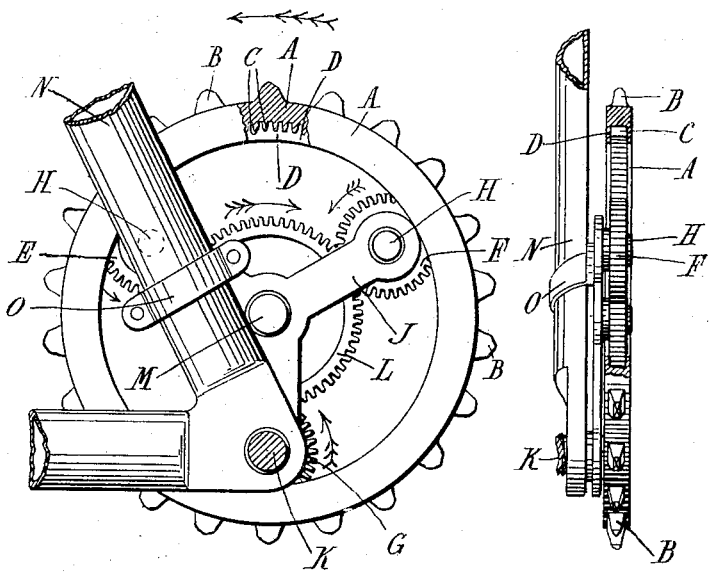
Figures 3, 4:
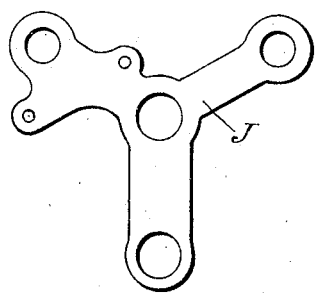
Figure 5:
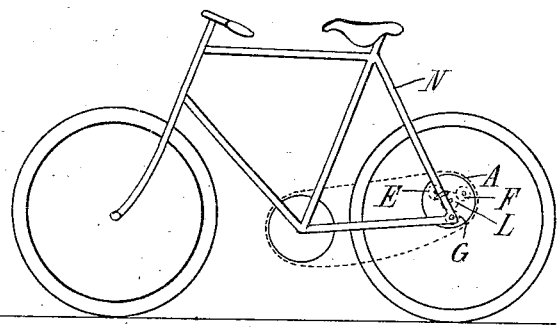

Referring to the drawings, which form a part of this specification, Figure 1 represents a side elevation, partly in section, of my invention. Fig. 2 shows a side view, partly in section, of Fig. 1. Fig. 3 is a view of the three-legged frame with the pinions and wheel removed. Fig. 4 is a side elevation of Fig. 3. Fig. 5 represents a gear attached to a cycle.

Similar letters of reference indicate similar or corresponding parts where they occur in the several views.

My invention includes a ring or wheel A, formed of any material. This has on its periphery external sprockets or teeth B. Inside the said ring are internal teeth C. The said teeth are double-shrouded, there being at each end of the teeth shrouds or flanges D. The said ring gears with and turns three pinions E F G. The teeth upon the said pinions are narrow, so that they fit between the double shrouds upon the ring before described. The upper or auxiliary pinions E and F turn upon studs H, one end of each of which studs is secured to the outer ends of arms on the three-legged frame J, hereinafter described. The lower or primary pinion G instead of rotating loosely upon a stud is secured to the hub or axle K to be driven. In the case of a cycle the pinion G is attached to and drives the rear wheel. The said hub or axle rotates within a suitable hole within the lower leg of the three-legged frame J.

In order to maintain the equilibrium of the three pinions E, F, and G and to distribute the strains thereon, I place between the three an intermediate toothed wheel L. This rotates upon a stud M on the frame J. The said toothed wheel L may be unshrouded or provided with a single or double shroud, dependent upon circumstances.

The three-legged frame J, before referred to, consists of a piece of sheet or other metal, and to it are either integrally or detachably attached the studs H and M. The said frame has through its bottom leg a hole for the hub or axle to be driven to pass. To attach the frame J to the backstays N or other portion of the machine, one or more clips or straps, such as O, are used.

As the ring A is rotated in the direction shown by the arrow in Fig. 1 it rotates the upper pinions E and F and the lower pinion G. These in their turn rotate the intermediate idle wheel L. The lower pinion G is therefore driven in two places, first, by the ring A, and, secondly, by the intermediate wheel L. Its turning moment is thereby improved.

With my invention the balancing of the strains by means of the three toothed pinions and the intermediate toothed wheel conduces considerably to the easy running of the machine.

Having now described my invention, what I claim as new, and desire to secure by Letters Patent, is—

1. A driving mechanism, comprising a support, a plurality of pinions journaled upon said support, an intermediate wheel meshing with said pinions and mounted upon said support, and a sprocket-wheel provided with internal teeth mounted upon said pinions.

2. In a device of the character described, the combination with an axle, of a primary revoluble gear-wheel keyed thereto, an intermediate revoluble gear-wheel meshing with said primary revoluble gear-wheel, a plurality of auxiliary revoluble pinions meshing with said intermediate revoluble gear-wheel, and a sprocket-wheel mounted upon said primary and auxiliary revoluble gear-wheels.

3. A driving-gear, comprising a support, a frame provided with a plurality of legs mounted upon said support, a revoluble pinion journaled upon each leg of said frame, an intermediate revoluble gear-wheel coacting with said revoluble pinions, and an outer revoluble member mounted upon said revoluble pinions.

4. A device of the character described, comprising a support, a primary and a plurality of auxiliary pinions journaled upon said support, a central pinion mounted upon said support and meshing with said pinions, and a sprocket member provided with parallel flanges projecting from its inner surface and having internal teeth formed thereon between said flanges mounted upon said primary and auxiliary pinions.

5. A device of the character described, comprising a support, a frame comprising a plurality of legs mounted upon said support, a pinion journaled upon said frame near the outer end of each leg, an intermediate pinion journaled upon the central portion of said frame, and a sprocket-wheel provided with parallel flanges and an internal toothed surface mounted upon said pinions.

6. In a device of the character described, the combination with a primary frame provided with a stay, of a legged frame mounted upon said primary frame, fastening means inclosing said stay and secured to said legged frame, a plurality of pinions mounted upon said legged frame, and an intermediate wheel of greater diameter than said pinions mounted in a central position upon said legged frame, and an internally-toothed sprocket member mounted upon said pinions.

7. In a device of the character described, the combination with a primary frame provided with a stay, of a frame provided with a plurality of legs mounted upon said primary frame, a clip encircling said stay secured to said legged frame, said legged frame provided with an extension formed upon each of its legs, a revoluble pinion journaled upon each extension, an intermediate revoluble gear-wheel journaled upon said legged frame and engaging said revoluble pinions, and a movable member, provided with a toothed inner and outer surface, mounted upon said revoluble pinions.

In witness whereof I have hereunto set my hand to this specification in the presence of two witnesses.

JAMES DICKASON.

Witnesses:
EDWIN PHILLIPS,
CECIL W. LE PLASTRIER.